United States Patent

Mullen

[11] Patent Number: 5,928,755
[45] Date of Patent: Jul. 27, 1999

[54] IMPACT CUSHION

[75] Inventor: Joseph Kenneth Mullen, Landisburg, Pa.

[73] Assignee: Joseph K. Mullen, Landisburg, Pa.

[21] Appl. No.: 08/819,682

[22] Filed: Mar. 17, 1997

[51] Int. Cl.$^6$ .............................. B32B 3/06; B32B 27/00
[52] U.S. Cl. .............................. 428/102; 428/71; 428/76; 428/424.6; 428/424.8; 428/304.4
[58] Field of Search ................ 428/71, 76, 102, 428/304.4, 424.8, 424.6

[56] References Cited

U.S. PATENT DOCUMENTS 3,833,259  9/1974  Pershing .............................. 297/452.27
5,356,354  10/1994 Owens ........................................ 428/35

*Primary Examiner*—Terrel Morris

[57] ABSTRACT

The Impact Cushion is a device created to reduce head and facial injury associated with the head banging and face rubbing behavior of acting out children and youth who are being restrained by adult caretakers in prone or supine positions on the floor or ground. The cushion is positioned between the child's or youth's head and the floor or ground to reduce impact to the head and friction on the face.

The inside of the Impact Cushion is made of a 16"×16"× 1.⅛" thick layer of prime virgin polyurethane laminated to crosslink a 16"×16"×1.¼" thick layer polyethylene (total thickness is 2.⅜"). The layers of polyurethane and polyethylene combine to provide a dynamic cushioning effect that absorbs impact. The outside is covered by 18 oz/sq.yd. heavy duty vinyl reinforced with 22×22 psi 1000 denier nylon woven fabric; anti bacterial and anti fungal. The vinyl cover provides a friction reducing surface that is free of bacterial and fungal contaminants and can be cleaned with household disinfectant for reuse. The cushion is 16"×16"× 2.⅜". The vinyl cover is machine sewn on two sides. The down (floor/ground) side of the cushion has two elastic straps that are 12" apart. The carrying straps are machine stitched at each end to the bottom side of the vinyl cover and are 6" long×1" wide.

2 Claims, 3 Drawing Sheets

IMPACT CUSHION

BACKGROUND OF THE INVENTION

1. Field of the invention

The present invention relates to a 16"×16"×2.⅜" vinyl covered layers of polyurethane and polyethylene that has been created into a cushion that can be placed beneath the head to reduce and prevent head and facial injury that occurs with acting out children and youth who engage in self harming head banging and face rubbing behavior when they are being physically held or restrained by adult caretakers in prone (face down) or supine (face up) positions on the floor or ground.

Teachers and youth care personnel who work with disturbed, delinquent and immature youth are often called upon to physically hold (restrain) these youth/students when they engage in aggressive and tantrum like behavior. Often, the acting out that occurs may become so threatening to the well being of the youth, others in the environment or valuable property that they must be held in floor control positions. (Restraint positions that are employed on the floor/ground in which the youth will be placed in a prone (face down) or supine (face up),laying position with staff restraining their movement by holding a combination of arms/legs/torso.) When these restraint positions are employed the youth being held often resort to head banging and/or face rubbing behavior. Obviously, these behaviors can be harmful to the youth in that they may cause head injury such as concussions as well as, contusions of the face. While potential injury might be prevented by stabilizing the head of the youth in question, such intervention is not an accepted practice in the field as neck injury can result when the head is held in a stable position and the youth continues to attempt movement. In fact, teachers and youth care workers are taught not to hold the head of the youth when this behavior occurs. However, they are advised to find something in the environment that can be placed beneath the head to reduce impact and friction. What exists in the environment is not always ideal. Typically a soft pillow might be used, however this intervention can lead to a higher level of risk in that the youth can bury their face in the pillow and reduce their intake of oxygen. The latter intervention has been associated with several cases in which the youth in question was asthmatic. In these cases, follow up investigations pointed out that the soft pillow may have played a part in stimulating an asthmatic seizure resulting in suffocation. This writer acted as expert witness in such a case in Lehigh County Pennsylvania. (Tallyman v. Kids Peace 1996) In this case Jason Tallyman, a twelve year old resident of Kids Peace (residential care program for disturbed youth in Allentown, Pennsylvania) died while being restrained in a prone position where a soft pillow was employed to reduce head injury. Jason was asthmatic. Medical testimony suggested that an asthmatic seizure might have been involved with Jason's suffocation.

In addition to the harm that may occur for youth involved in these situations, the staff who are have responsibility for managing the youth's behavior often find themselves accused of child abuse after such incidents because head banging and face rubbing behavior has caused injury. In every state the investigation of child abuse is a formalized process. When childcare staff are formally accused of child abuse they are temporarily relieved of duty and are subjected to a rigorous investigation process. The outcome of this process could even result in a loss of employment. Too, the organization (youth program) in which these incidents occur have liability concerns when such behavior is mismanaged by staff. In the case of Jason Tallyman cited above the organization, Kids Peace, settled a wrongful death suit out of court with Jason's parents. While the actual settlement was sealed by the agreement, it is known that millions of dollars were at stake.

2. Prior Art

The fields of youth care and youth education have struggled with the issue of managing acting out behavior by youth and students. During the past few decades staff training curricula in crisis intervention and physical restraint techniques have been developed to meet this need. Prior to 1980 little, if any, formal training curricula were available. Since then, numerous training companies specializing in the management of acting out behavior in children and youth have developed. Most of these curricula demonstrate substantial concern for the safety of both the children and the adults who become involved in these incidents. Intervention techniques that are taught are usually directed at safe guarding the acting out youth and the intervening adult. One area in which these training programs have provided only rudimentary guidance is in methods by which injury to youth associated with head banging and face rubbing behavior can be reduced or prevented. Most of these training programs recommend that intervening staff find an object in the environment to place between the restrained youth's head and the floor to reduce the impact of head banging and friction caused by rubbing the face on the floor. Left to their own creativity, intervention staff use what may be available in the moment. There is no existing device specifically designed to provide this protection.

The "Impact Cushion" provides a device that can be used to specifically reduce and prevent injuries associated with head banging and face rubbing behavior. It's use can dramatically reduce the frequency of child abuse allegations associated with that behavior. Finally, use of the cushion can impact the potential of significant liability cost that may be associated with some of these incidents in which injury might occur.

SUMMARY OF THE INVENTION

According to the present invention, there is provided a cushion composed of two layers (one of polyurethane and one of polyethylene) which when combined exhibit dynamic cushioning properties which are such as to reduce the chance of injury to the head associated with head banging behavior. The two layers are covered with a heavy duty vinyl reinforced by nylon woven fabric which provides a durable surface that is non abrasive which will reduce friction that causes facial contusions associated with face rubbing behavior. In the action of physically restraining an acting out youth on the floor/ground in either a prone or supine position the cushion would be placed between the acting out youth's head and the floor/ground. It is placed so that the youth's head is centered on the cushion. The cushion is held in place by the intervening adult to prevent the head from contacting the floor. The youth is allowed to rub their face on the cushion or to bang their head upon it. The cushion provides a portable, reusable, non abrasive surface that will accept and soften any impact. The non abrasive surface and the combined layers of polyurethane and polyethylene reduce the occasion of injury. After use it is cleaned with household disinfectant and stored for future use.

There is no other portable, reusable item specifically designed to prevent injury to the head during physical restraint that occurs on the floor/ground. The cushion was invented to meet this need. The inventor provides professional seminars to teach physical restraint techniques to teachers and youth care workers. During these seminars, reports of head banging behavior by youth stimulated the idea to create the cushion. With this in mind the inventor approached the Resilite company of Northumberland, Pa. (manufacturers of NCAA wrestling mats) to discuss the creation of such a cushion. Three prototypes were designed. The first two were immediately dismissed as inadequate. The third, which was fundamentally the same as the final version, was field tested in several children and youth settings and found to be effective in reducing injury associated with head banging behavior. After feedback from the field testing sites, the size of the cushion was reduced from 18"×18" to the present "16×16" model and the elastic straps were added.

BRIEF DESCRIPTION OF THE DRAWING

Contained in three sheets, there are 3 figures described as follows.

DETAILED DESCRIPTION OF THE PREFERRED EMBODIMENTS

Figure 1:
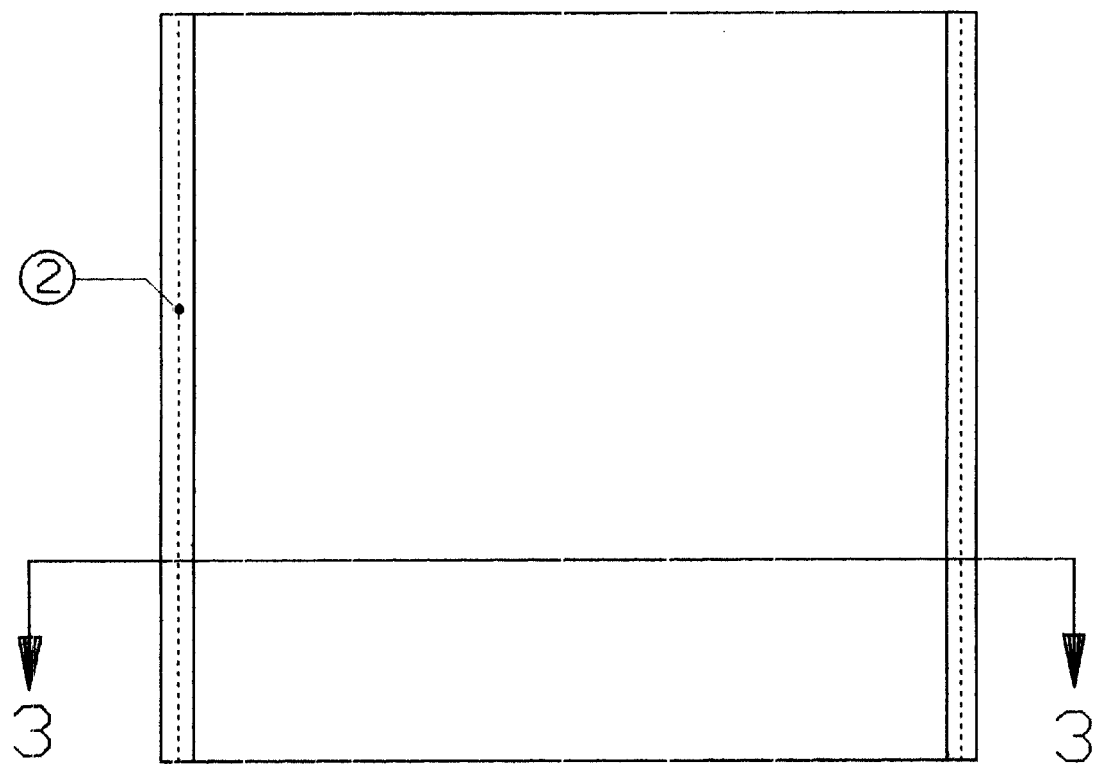
FIG. 1 is a top view of the impact cushion with reference to a cross sectional view (item 3) found in FIG. #3. On two sides of the cushion are machine stitched seams (item 2).
Figure 2:
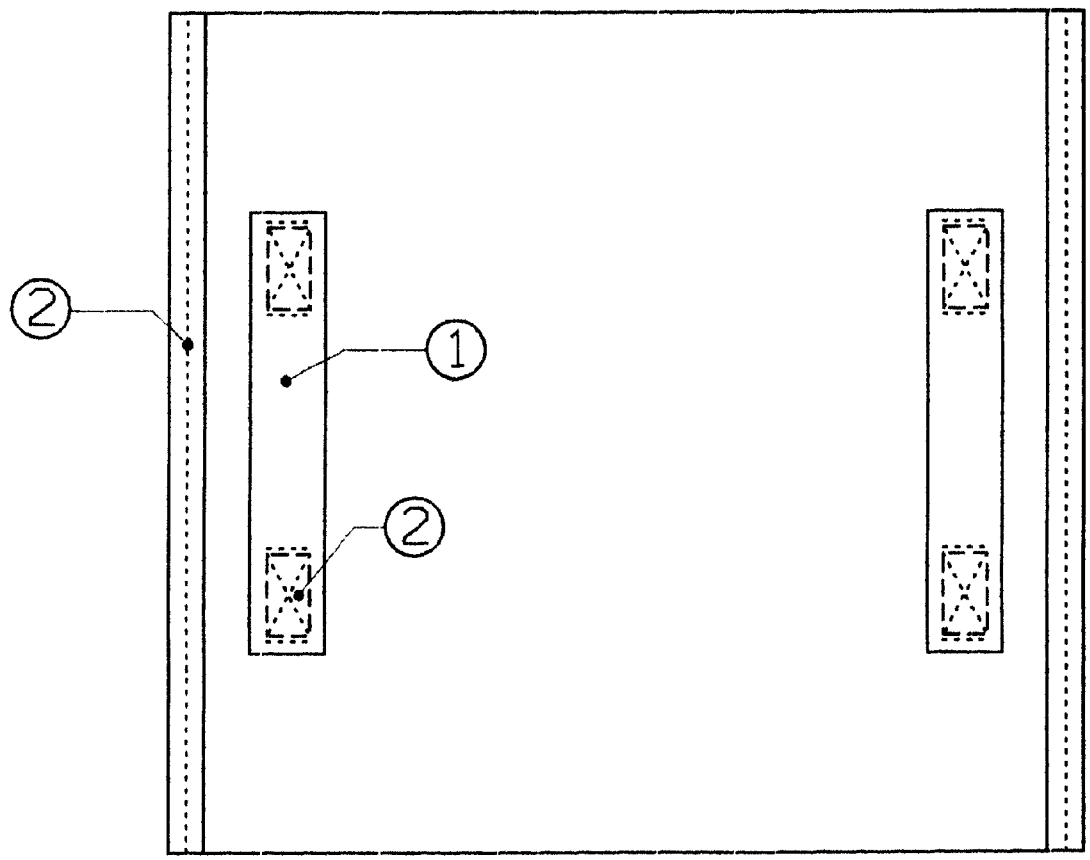
FIG. 2 is a bottom view of the cushion showing two elastic straps (item 1). Stitching for the straps and the cushion seams are indicated by (item 2).

Referring now to the drawings that depict the present invention, the system of parts (FIGS. 1–3) that can be assembled to produce the impact cushion for the protection of children and youth who engage in head banging and face rubbing behavior when being restrained on the floor or ground consists of a vinyl covered composite of two layers, one of polyurethane and one of polyethylene which is machine stitched on two sides and to which are attached on the bottom side, two elastic straps.

The cushion cover (item 3, FIG. 3) is heavy duty (18 Oz./sq. yd) vinyl that is reinforced by 22×22 psi 1000 denier nylon woven fabric. The non abrasive vinyl cover is a smooth, anti fungal and anti bacterial surface which reduces the friction associated with face rubbing and the potential of fungal or bacterial infections that might occur in conjunction with this behavior. The durable nature of the vinyl is strong enough to withstand the impact of head banging behavior.

The elastic handles on the bottom of the cushion (item 1, FIG. 2) are machine stitched to the vinyl cover to insure attachment. They are 1"×6" and serve as handles by which the cushion can be carried. They are located twelve inches apart.

Figure 3:
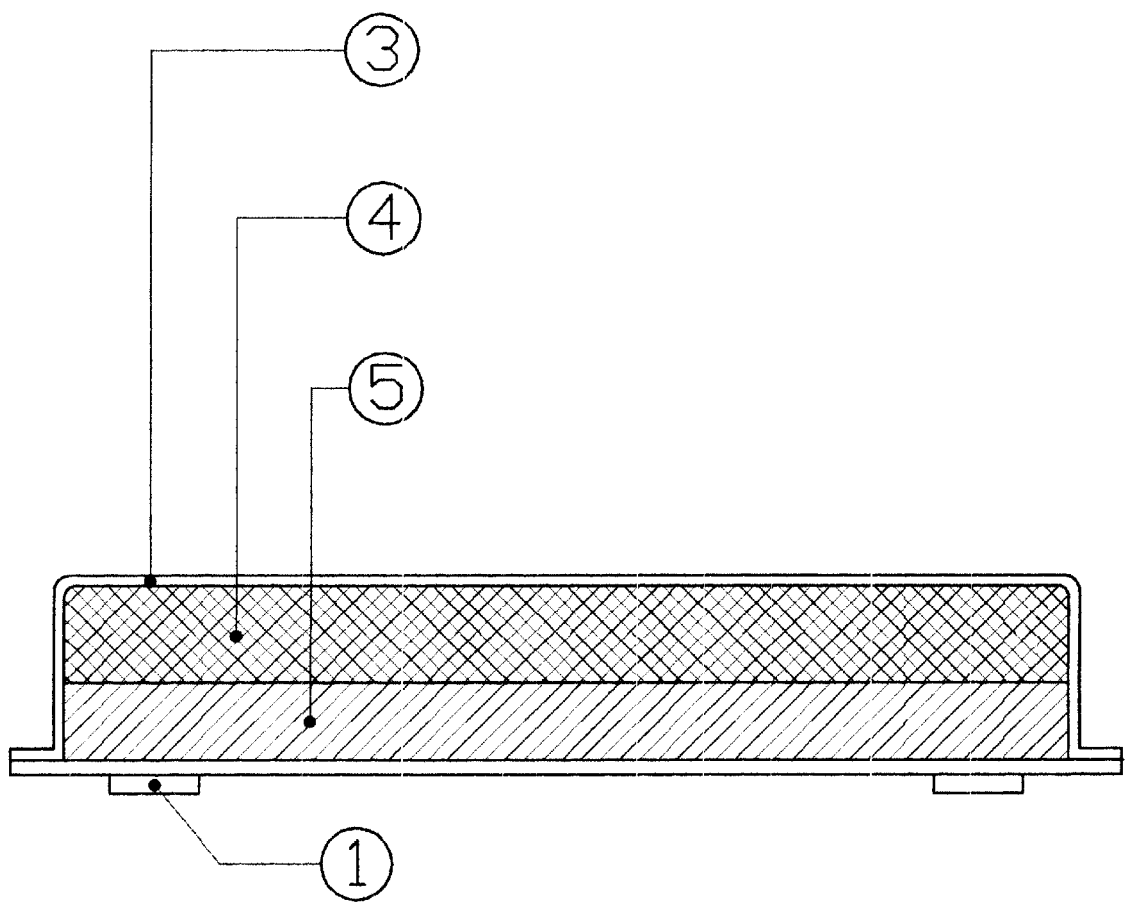
FIG. 3 is a cross sectional view of the cushion revealing the elastic straps (item 1), the heavy duty vinyl cover backed by nylon fabric (item 3), the layer of prime virgin polyurethane (item 4) and the layer of polyethylene (item 5).

The dynamic cushioning effect of the invention is caused by combining a 16"×16"×1⅛" layer of prime virgin polyurethane (item 4, FIG. 3) with a 16"×16"×1¼" layer of polyethylene (item 5, FIG. 3). This combination of layers is used routinely in the construction of athletic tumbling and wrestling mats in which total body weight is involved during impact. The impact potential of head banging behavior is significantly less than total body weight impact because of the speed with which the head can be moved when in a restrained position and because of the distance the head will actually travel in route to impact.

While significant injury can occur with such behavior without some cushioning device, the makeup of the device must do more than reduce impact. For example, a cushion device that is too soft (e.g. bed pillow) would provide less interruption of the impact and may provide the undesired effect of interference with breathing. A cushion device that is abrasive may promote facial injury. A cushion that cannot absorb impact may also harm. In addition, because the device is to be used with various individuals on various occasions it must not only carry anti fungal and anti bacterial properties but tolerate after use cleansing with household disinfectant. The composition of the invention's vinyl cover allows for the latter.

When placed together the composite parts of vinyl cover over layers of polyurethane and polyethylene provide a device that can be used to significantly reduce the injuries associated with head banging and face rubbing behavior by children who are being restrained. Heretofore, there was no specific device available to provide a safe, injury reducing intervention for children engaging in such behavior.

I claim:

1. An impact cushion composed of two layers, a first layer being of polyurethane having dimensions of 16 inches by 16 inches by 1⅛ inches and a second layer of polyethylene having dimensions of 16 inches by 16 inches by 1¼ inches wherein the two layers are covered by a heavy duty nylon reinforced vinyl fabric wherein the covered layers are machine stitched on two sides that are to be placed beneath the head of a restrained, acting out youth in order to reduce impact and friction associated with injuries caused by head banging and face rubbing activity.

2. The impact cushion as claimed in claim 1, wherein the heavy duty cover layer is antifungal and anti-bacterial and resistant to cleaning with a household disinfectant.

\* \* \* \* \*